(12) United States Patent
Wasilewski

(10) Patent No.: US 6,652,330 B1
(45) Date of Patent: Nov. 25, 2003

(54) STORAGE BATTERY MONITORING SYSTEM WITH AUTOMATIC ELECTRICAL LOAD SHEDDING

(75) Inventor: Kurt J. Wasilewski, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/213,752

(22) Filed: Aug. 6, 2002

(51) Int. Cl.⁷ ............................................. B63H 19/00
(52) U.S. Cl. ................................................ 440/1; 440/2
(58) Field of Search ........................................ 440/1, 2

(56) References Cited

U.S. PATENT DOCUMENTS

| 4,468,606 | A | | 8/1984 | Quintal ......................... 320/61 |
| 4,888,495 | A | * | 12/1989 | Feron et al. .................. 307/39 |
| 5,126,650 | A | | 6/1992 | Iwatani ......................... 322/99 |
| 5,315,287 | A | | 5/1994 | Sol ............................ 340/455 |
| 5,352,929 | A | | 10/1994 | Kohl et al. .................... 290/36 |
| 5,448,152 | A | | 9/1995 | Albright ....................... 320/15 |
| 5,568,052 | A | * | 10/1996 | Sway-Tin et al. ............. 324/435 |
| 5,896,022 | A | | 4/1999 | Jacobs, Sr. .................. 320/103 |
| 5,963,013 | A | | 10/1999 | Watson et al. ............... 320/107 |
| 6,273,771 | B1 | | 8/2001 | Buckley et al. ................ 440/84 |
| 6,342,775 | B1 | | 1/2002 | Sleder, Sr. ................... 320/116 |
| 6,404,163 | B1 | * | 6/2002 | Kapsokavathis et al. ..... 320/104 |

FOREIGN PATENT DOCUMENTS

WO    WO 89/12343    * 12/1989

* cited by examiner

Primary Examiner—Sherman Basinger
(74) Attorney, Agent, or Firm—William D. Lanyi

(57) ABSTRACT

A method for controlling the electrical system of a marine vessel comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

16 Claims, 4 Drawing Sheets

STORAGE BATTERY MONITORING SYSTEM WITH AUTOMATIC ELECTRICAL LOAD SHEDDING

BACKGROUND OF THE INVENTION

1. Field of the Invention

The present invention is generally related to a battery monitoring system and, more particularly, to a system that continually monitors the voltage across the terminals of a storage battery of a marine vessel and, in response to a low voltage potential across the battery, automatically selects electrical loads that are to be shed in order to protect the battery from depletion.

2. Description of the Prior Art

In marine vessel electrical systems, it is very important to protect the electrical storage battery from inadvertent and unexpected depletion. Unlike ground-based vehicles, such as automobiles, tractors, trucks, and motorcycles, a marine vessel with a depleted battery and an inability to start the engine of the marine vessel can be very distant from its home port or any other location where emergency assistance can easily be obtained. Therefore, it is well known to those skilled in the art that the charging and maintenance of an electrical charge across an electrical storage battery of a marine vessel is very important. It is also very important that the use of the battery to provide power for certain electrical loads on the marine vessel be monitored to make sure that the battery isn't inadvertently depleted by running excessive loads without providing an effective recharging of the battery.

U.S. Pat. No. 6,342,775, which issued to Sleder on Jan. 29, 2002, discloses an automatic battery switching circuit for a marine propulsion system. The circuit provides a mechanism by which a plurality of electrical storage batteries can be alternatively connected in parallel or series based on the position of a manually controlled joystick of a marine positioning and maneuvering system. When the joystick is in a neutral position in which no docking motion is demanded by the marine vessel operator, the storage batteries are connected in parallel so that they can benefit from charging by an alternator or generator associated with an internal combustion engine. If the joystick is moved out of its neutral position, the batteries are immediately connected in series to provide power to a plurality of electrical motors that are used to drive a plurality of impellers of the docking system.

U.S. Pat. No. 5,963,013, which issued to Watson et al on Oct. 5, 1999, describes a storage battery charging apparatus and methods. The apparatus and method for charging a battery in a transported apparatus from the electrical system of a transporting vehicle is described. In one aspect of the invention, there is provided a circuit means for determining when a battery has been sufficiently recharged, adapted to be respectively coupled to both the battery of the transported apparatus and the electrical system of the transporting vehicle. The circuit means may include means for determining the status of the battery being charged such as a meter, an array of lights, or an array of light emitting diodes, the number and sequence of illumination being indicative of the extend to which the battery has been recharged.

U.S. Pat. No. 5,896,022, which issued to Jacobs on Apr. 20, 1999, describes a battery charge managing system. A modification kit for the addition of an auxiliary battery charge management system for a marine or land vehicle having a starting battery and an auxiliary battery is described. The kit includes a single pole breaker, a normally-on relay, and a two-way toggle switch. The single pole breaker is inserted in a circuit of the auxiliary battery system and the normally-on relay and the toggle switch are inserted in the starting battery circuit of the vehicle to provide a dual mode charging system adapted to manual and automatic power regeneration of the starting battery and the auxiliary battery system.

U.S. Pat. No. 5,448,152, which issued to Albright on Sep. 5, 1995, describes a battery management system. The system maintains a charge on at least one auxiliary battery by switching the auxiliary battery automatically into parallel with the main battery charging circuit or with the auxiliary load. The system uses the AC component of the charging signal of a vehicle or boat charging system to trigger switching circuits coupled to operate relays or similar switching means which couple the auxiliary battery to the main charging circuit. When no charging signal is present, such as when the vehicle or boat engine is turned off, the auxiliary battery is switched automatically out of the charging system and is charged and in condition for use.

U.S. Pat. No. 5,315,287, which issued to Sol on May 24, 1994, describes an energy monitoring system for recreational vehicles and marine vessels. The invention continuously monitors the current drawn from the on board battery system of a recreational vehicle marine vessel. The device calculates and displays the energy remaining as a portion of the total capacity by accumulating over time the net energy drawn out of the battery. The device accurately accounts for the known effect of effectively lower battery capacities at higher current draws, and also allows the user to reinitialize the battery system capacity to reflect either degradation of the battery capacity with time or upgrades to the battery system.

U.S. Pat. No. 4,468,606, which issued to Quintal on Aug. 28, 1984, describes a system for charging the battery and operating the electrical accessories of a sailboat. The system comprises an alternator having a stator winding adapted for connection to the battery through suitable current rectifiers and a rotor field winding coupled to the auxiliary propeller shaft of the boat. Circuit means for controlling the energization of the field winding of the alternator from the output voltage of the stator winding, so as to permit the alternator to provide adequate current to charge the battery and operate the electrical accessories of the sailboat, and a voltage regulator adapted for connection to the field winding of the alternator for controlling the output voltage of the stator winding when such output voltage reaches a predetermined value.

U.S. Pat. No. 5,126,650, which issued to Iwatani on Jun. 30, 1992, describes an indication device for a vehicle charging and generating system. The device is capable of informing the operator of the relation between the amount of power generation available and the amount of electrical load applied, thereby enabling the operator to turn off unnecessary electrical loads to prevent the overdischarging of a battery. The indication device includes an AC generator having a field coil and driven by a vehicle engine, and a storage battery connected to an electric load and to the generator. A voltage regulator detects the output voltage of the generator or the voltage of the battery and has a power transistor electrically connected in series with the field coil of the generator to regulate the output voltage of the generator at a prescribed level. A converter operates to convert the rate of electrical conduction of the power transistor into a corresponding voltage level, and an indication meter is connected to the converter to display the utilized percentage of power generating capacity of the generator.

U.S. Pat. No. 5,352,929, which issued to Kohl et al on Oct. 4, 1994, describes an apparatus and method for regulating a generator of an internal combustion. The system has a starter device including a charge control signaling device, an excitation coil for the generator and a voltage regulator controlling an excitation current in the excitation coil and an excitation current limiting device for limiting the excitation current during a predetermined starting phase connected to the voltage regulator. The excitation current limiting device detects whether the engine is in a starting phase. If the engine is in a starting phase, the excitation current limiting device reduces the excitation current so that a voltage is produced at a generator terminal which permits no load current and simultaneously guarantees that the charge control signaling device is shut off. After ending of the starting phase the excitation current limiting device is shut off and the excitation current is increased to its standard value which results in a generator output voltage which is above the power supply voltage that charges the battery.

U.S. Pat. No. 6,273,771, which issued to Buckley et al on Aug. 14, 2001, discloses a control system for a marine vessel. The control system incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

The patents described above are hereby expressly incorporated by reference in the description of the present invention.

As is well recognized by those skilled in the art, the monitoring and protection of a storage battery's voltage potential to start the marine engine of a marine vessel is highly important in order to assure that the marine vessel is capable of returning to its home port or to a shore based location where maintenance can be performed on the marine vessel if a component or system malfunctions.

SUMMARY OF THE INVENTION

A method for controlling the electrical system of a marine vessel, made in accordance with the preferred embodiment of the present invention, comprises the steps of measuring the voltage potential of an electric storage battery of the marine vessel. It also comprises the step of comparing the voltage potential to a threshold voltage potential. The preferred embodiment of the present invention then disconnects one or more of a plurality of electrical power consuming devices when the voltage potential of the storage battery is less than the threshold voltage magnitude.

In certain embodiments of the present invention, the method further comprises of measuring the operating speed of the engine of the marine vessel, comparing the operating speed of the engine to a threshold speed magnitude, and performing the disconnecting step only when the operating speed of the engine is less than the threshold speed magnitude.

In a particularly preferred embodiment of the present invention, the method further comprises the steps of communicating to an operator of the marine vessel that the voltage potential is less than the threshold voltage magnitude and then performing the disconnecting step unless the operator of the marine vessel manually overrides the disconnecting step. The present invention can further comprise the step of waiting for at least one minute following the communicating step for a response from the operator of the marine vessel before performing the disconnecting step.

In a particularly preferred embodiment of the present invention, it further comprises the step of classifying each one of the plurality of electrical power consuming devices according to its priority of criticality, wherein the priority of criticality is determinative of the order in which each of the plurality of electrical power consuming devices is disconnected during the disconnecting step. The classifying step can comprise the steps of grouping the electrical power consuming devices into a level of priority of criticality which is selected from the group consisting of critical and non-critical. The classifying step is performed in accordance with manually received instructions from the operator of the marine vessel in a preferred embodiment of the present invention.

After performing the disconnecting step, one embodiment of the present invention further comprises the step of measuring the voltage potential of the battery again in order to determine the efficacy of the disconnecting step.

A preferred embodiment of the present invention further comprises the steps of measuring a current consumption of at least one of the plurality of electrical power consuming devices and comparing the current consumption of that measured device to a threshold current magnitude. That embodiment of the present invention further comprises the step of disconnecting the electrical power consuming device when the current consumption of that device is greater than the threshold current magnitude.

In a preferred embodiment of the present invention, the measuring and comparing steps are repeated at a frequency of at least once per second.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
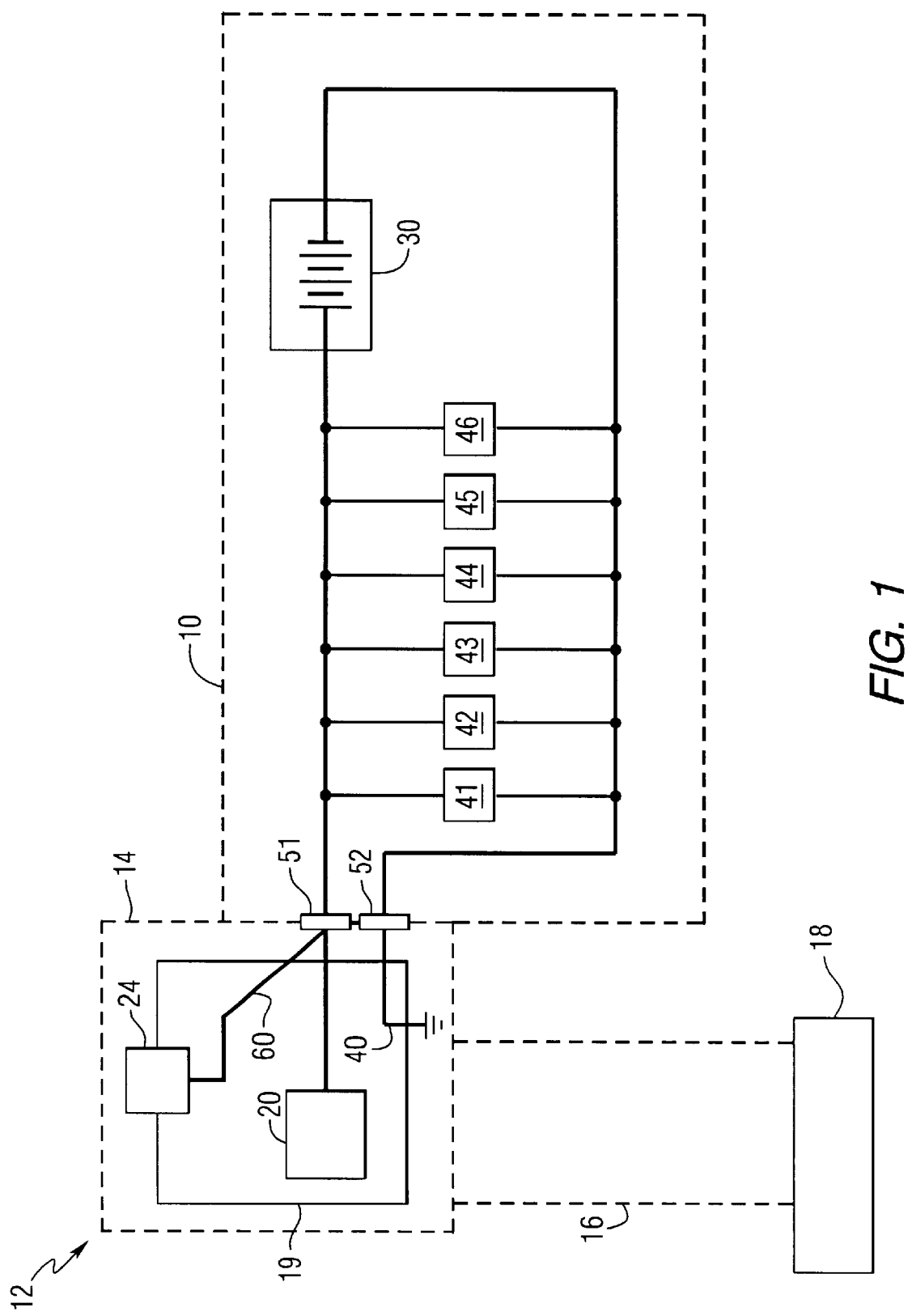
FIG. 1 is a schematic representation of an electrical system of a marine vessel.

Throughout the description of the preferred embodiment of the present invention, like components will be identified by like reference numerals.

FIG. 1 is a schematic representation of a marine vessel 10 with a marine propulsion unit 12 attached to it. For purposes of illustration, the marine propulsion unit 12 is illustrated as an outboard motor having a powerhead 14, a driveshaft housing 16, and a gearcase 18 that supports a propeller shaft. It should be understood, however, that the present invention is not limited to any particular type of marine propulsion system and is equally applicable to a sterndrive, inboard, or jet pump-type marine propulsion system.

The marine propulsion system 12 includes an engine 19 that is provided with a starter motor 20 and an alternator 24. A storage battery 30 is connected to the starter motor 20, the alternator 24, and a point of ground potential 40. Also connected between the terminals of the battery 30 is a plurality of electrical power consuming devices, 41–46. Although six electrical power consuming devices, 41–46, are illustrated in FIG. 1, it should be understood that many more such devices can be used on a marine vessel. These devices can comprise a global positioning sensor (GPS), a sonar depth finder, a lighting system, an air conditioning system, a refrigerator, and various other appliances and systems that require electric power. The portion of the electrical system contained within the marine propulsion system 12 is connected, by terminal blocks 51 and 52, to the electrical system of the marine vessel 10.

When the engine 19 is operating, the alternator 24 generates a current, on line 60, which charges the battery 30. In order for the charging of the battery 30 by the alternator 24 to be effective, the engine 19 must be operating at some minimum speed, or RPM. Normally, the standard idle speed of the engine 19 is sufficient to provide a current on line 60 to adequately charge the battery 30. However, when the engine 19 is operated at idle speed and numerous electrical power consuming devices, 41–46, are in operation, those electrical power consuming devices can use a sufficient amount of electric current to adversely affect the charging capability of the alternator 24. In other words, the alternator 24 may not be able to provide sufficient current on line 60 to both charge the battery 30 and provide electrical power to operate the plurality of electrical power consuming devices that are currently connected across the battery 30. This situation can lead to a significantly deleterious circumstance where the electrical power consuming devices, 41–46, are actually drawing sufficient electrical current to be discharging the battery 30 even through the engine 19 is operating at idle speed. As a result, the battery 30 may not have sufficient power to start the engine 19 if it is turned off. It would therefore by significantly beneficial if a monitor could be provided which prevents this potentially deleterious condition from occurring.

Figure 2:
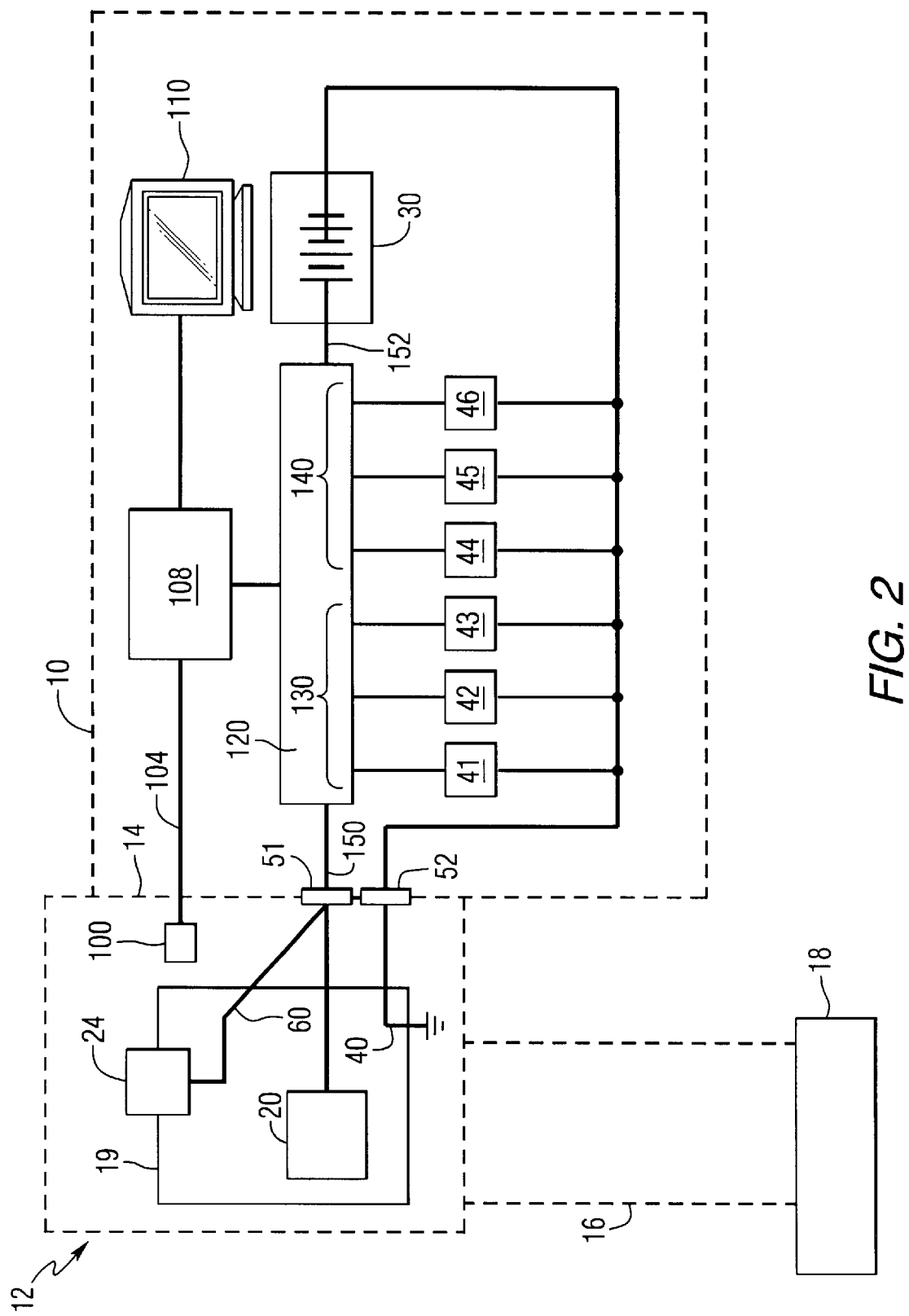
FIG. 2 is a representation of an electrical system of a marine vessel with the present invention included.

In FIG. 2, the present invention is shown incorporated into the electrical system described above in conjunction with FIG. 1. A propulsion control module 100 provides signals, on a bus 104, to a control helm interface (CHI) which is identified by reference numeral 108. Both the propulsion control module 100 and the customer helm interface 108 comprise microprocessors. An interface 110 with the operator of the marine vessel is provided so that communication can be used in conjunction with the present invention. The interface 10, or video monitor, is provided so that the present invention can communication certain information to the operator of the marine vessel and, in turn, receive inputs from the operator. The electrical power consuming devices, 41–46, are connected between ground potential and a load shedding apparatus 120 which will be described in greater detail below. The load shedding apparatus 120 is connected in signal communication with the customer helm interface 108.

For purposes of illustrating a preferred embodiment of the present invention, the plurality of electrical power consuming devices, 41–46, are categorized into a critical category 130 and a non-critical category 140. These categories are identified by brackets in FIG. 2. As an example, the critical category 130 of electrical power consuming devices, which includes devices 41–43, can include a radar system, a global positioning sensor (GPS), and a marine radio. The non-critical category 140, which includes electrical power consuming devices 44–46, can comprise fish locators, live well aerators, stereo sound systems, refrigerators, and air conditioning systems. It should be understood that although two categories, 130 and 140, are described above in conjunction with FIG. 2, many more categories can be used within the scope of the present invention. In addition, it should be understood that the identification of the level of criticality of each of the devices, 41–46, can be manually determined. The present invention uses the level of criticality of the various electrical power consuming devices, 41–46, during the load shedding procedure which will be described below.

With continued reference to FIG. 2, the load shedding device 120 is connected, by line 150, to terminal block 51 which is, in turn, connected to the starter motor 20 and the alternator 24. The load shedding device 120 is also connected, by line 152, to the battery 30.

Figure 3:
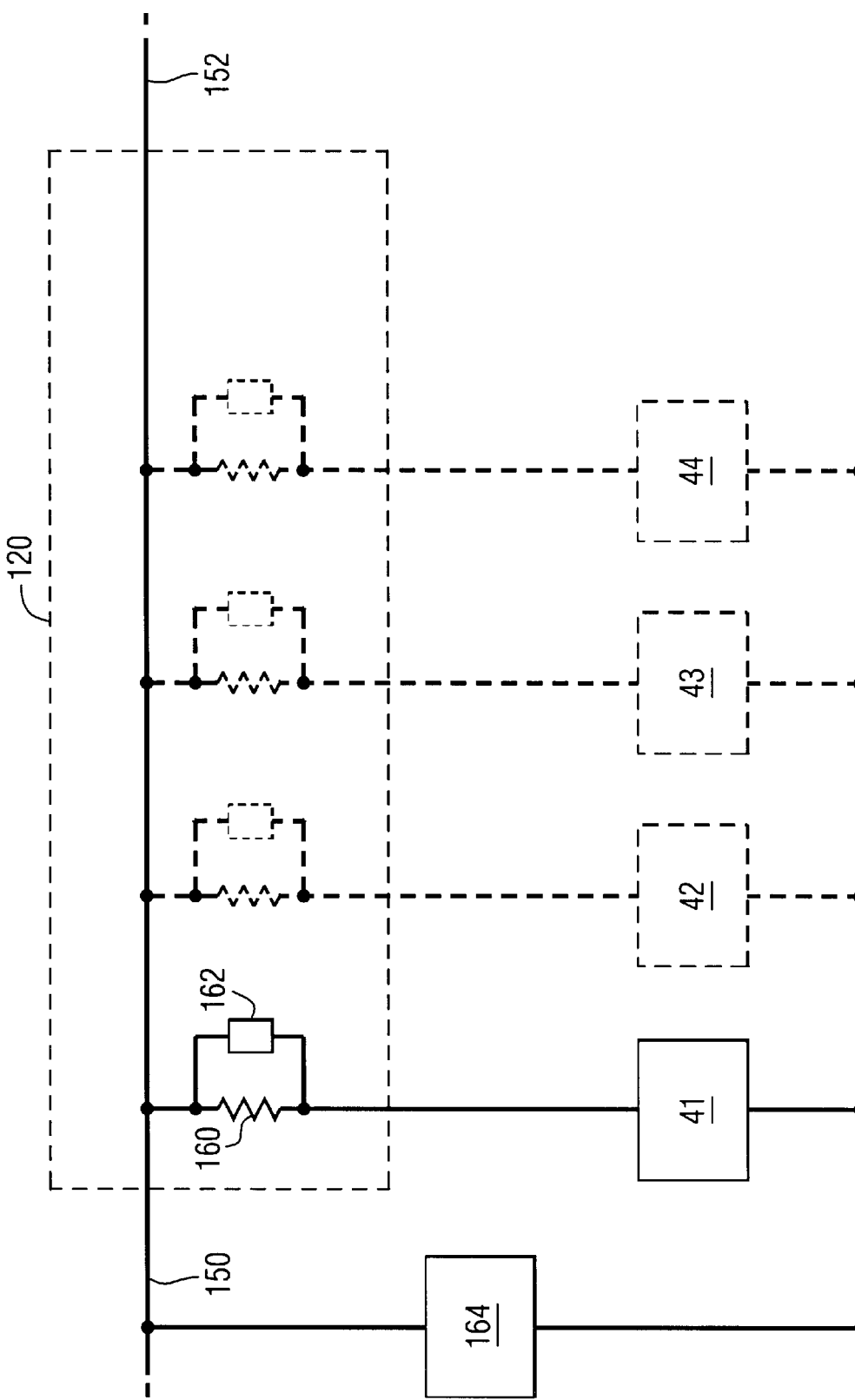
FIG. 3 is an enlarged view of a portion of the device shown in FIG. 2.

FIG. 3 is an isolated representation of the load shedding device 120. Within the load shedding device 120, a sensing resistor 160 is connected in series with electrical power consuming device 41 between the terminals of the battery 30, describes above in conjunction with FIG. 2. A voltage sensing component 162 is provided to measure the voltage drop across the sensing resistor 160 and, therefore, determine the current flowing through the electrical load 41. Each electrical load can be provided with an individual sensing resistor 160 and voltage measuring device 162, as suggested in FIG. 3. Alternatively, a single sensing resistor can be provided in series with each of the categories of criticality, such as categories 130 and 140 described above in conjunction with FIG. 2. Either arrangement can be used in conjunction with the present invention. The sensing resistor 160 allows the customer helm interface 108 to measure the current being drawn by each of the electrical loads, 41–46, or by the selected groupings, 130 and 140, of the electrical power consuming devices. In addition, a voltage sensing component 164 is shown connected across the terminals of the battery 30 to measure the voltage potential across the battery.

It should be understood that the present invention is intended to address a particular and specific problem relating to the use of a marine vessel with the engine 19 operating at an idle speed or below. In this type of situation, the operator of the marine vessel may have taken the marine vessel to a point that is distant from shore and, while the engine 19 continues to operate at idle speed, operates several of the electrical power consuming devices, 41–46. During this type of situation, the alternator 24 will attempt to provide sufficient current on line 60 to charge the battery 30. However, if numerous electrical devices are operated under these circumstances, the combination of the electrical current draw of those devices, 41–46, may require a greater current than is provided by the alternator 24. In that circumstance, the battery 30 is actually providing power to the plurality of electrical power consuming devices, 41–46, as opposed to receiving charging current from the alternator 24. Eventually, the power of the battery 30 is depleted below that which is required to start the engine 19 by powering the starter motor 20. If the engine 19 is turned off for any reason, the battery 30 may not have the required electrical power to allow the engine 19 to be restarted. As a result, the marine vessel may be stranded at a location which is distant from shore.

Figure 4:
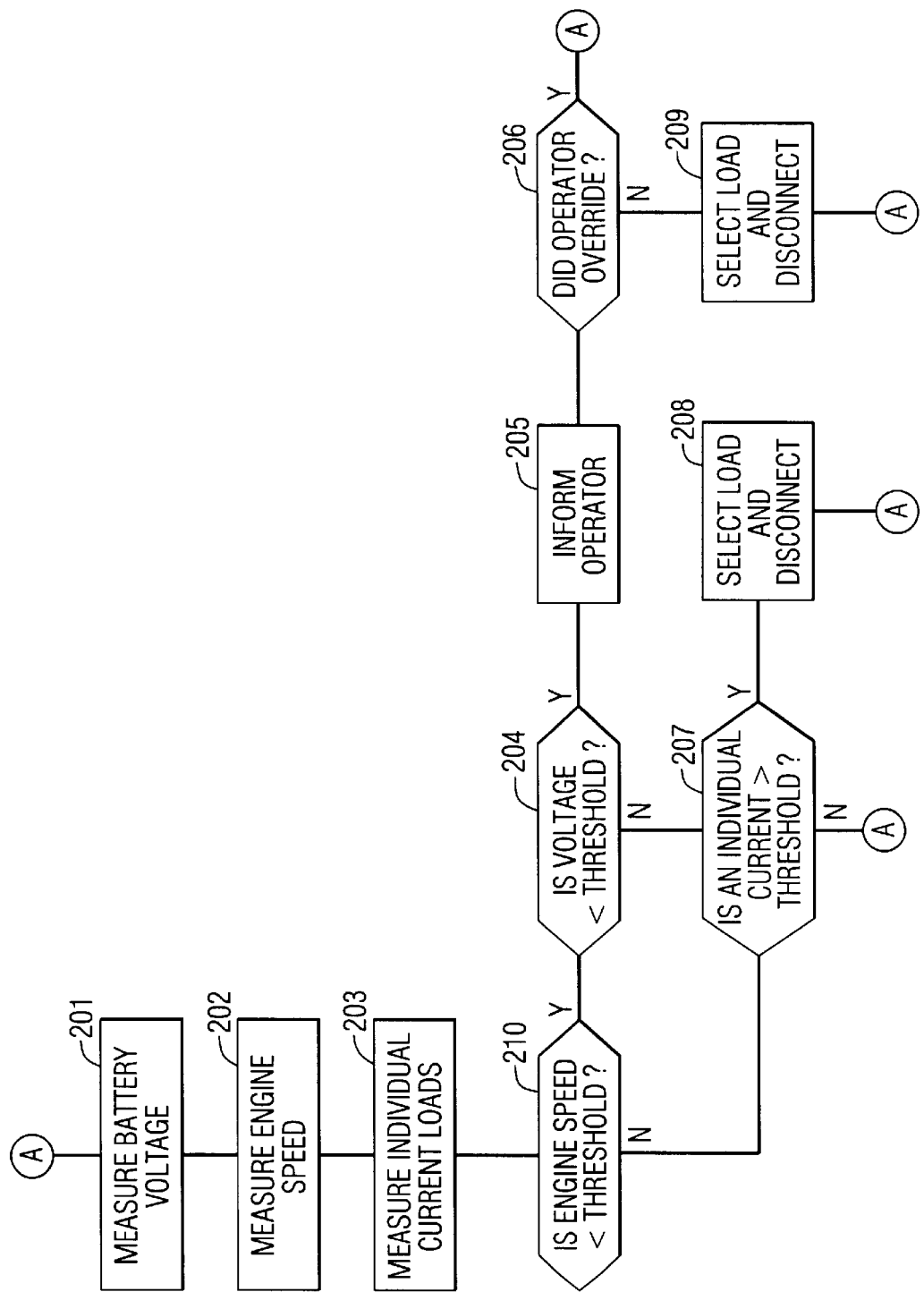
FIG. 4 is flow chart showing the basic steps of the present invention.

In order to avoid the disadvantageous circumstance described above, the present invention measures the potential of the battery, with device 164, and compares the voltage potential to a threshold voltage magnitude stored in the customer helm interface 108. With reference to FIG. 4, this method step is identified in functional block 201. In a particularly preferred embodiment of the present invention, the engine speed is also measured, by a tachometer, as represented in functional block 202. The individual current loads are measured, as described above in conjunction with FIG. 3, by measuring the voltage drop across sensing resistor 160. This is identified in functional block 203. As described above, the current measurements can be made for each individual load, 41–46, or for preselected groups, such as those identified by reference numerals 130 and 140 in FIG. 2. As identified by functional block 204, the battery voltage potential is then compared to a threshold voltage magnitude. If the battery potential is less than the threshold voltage magnitude, the operator of the marine vessel is informed as represented by functional block 205. This is normally accomplished by providing an alarm message on the video monitor 110. This can also be accompanied by an audible alarm, such as a buzzer or horn, to make sure that the operator is aware of the condition. This gives the operator an opportunity to override the imminent step of disconnecting one or more of the electrical power consuming devices, 41–46. If the operator chooses to override, as described in functional block 206, the microprocessor returns to the beginning of the sequence without disconnecting any of the loads. It should be understood that failure to disconnect one or more of the electrical loads, 41–46, may result in the depletion of the battery 30, but this is only done when the operator explicitly instructs the present invention that the disconnecting step should not be performed. With regard to the comparison of the battery voltage and the threshold voltage magnitude, as described above in conjunction with functional block 204, it should be understood that this comparison may be delayed for a preselected period of time whenever a known current intensive operation is taking place, such as the period when the marine propulsion system trim angle is being changed. During a trimming operation, the battery potential would typically be expected to drop momentarily because of the large current draw usually experienced during this operation. To avoid a false alarm condition, the present invention delays the comparison step of functional block 204 during trimming procedures and certain other operations which may temporarily lower the battery potential.

With continued reference to FIG. 4, if the battery voltage is not less than the threshold voltage magnitude, the individual currents flowing through the one or more of electrical loads, 41–46, or through a grouping of the electrical loads, 130 and 140, is greater than a threshold current magnitude, as represented by functional block 207, the electrical load drawing the excessive current is identified and disconnected as represented by functional block 208.

With continued reference to FIG. 4, the selection of the one or more electrical loads to be disconnected when the operator fails to override this disconnecting step, as described in conjunction with functional block 206, is done according to a priority level of criticality. This is represented by functional block 209. It should be understood that the individual electrical loads, 41–46, can each be given a priority level that dictates the order in which the loads will be disconnected in the event that the present invention senses that the battery voltage is lower than the threshold voltage magnitude. This prioritization of criticality can be done by the operator of the marine vessel. In other words, the operator may decide that the marine radio is the most important device on the marine vessel, followed in order by the GPS and radar systems. The operator may also decide that the fish locator is the least critical device. Although these are only examples, it should be understood that the operator of the marine vessel is provided with a choice of identifying the level of criticality of each of the devices. Alternatively, if the electrical loads are grouped according to two or more categories of criticality (e.g. critical and non-critical), the present invention could be instructed to disconnect all non-critical loads whenever the battery voltage falls below the threshold voltage magnitude. These are all alternative embodiments of the present invention and it should be understood that they are within its scope.

With continued reference to FIG. 4, it can be seen that a decision step, identified by reference numeral 210, can be included in the method. This step relates to the comparison of the engine speed, as measured at functional block 202, with a threshold speed magnitude. In other words, if the engine 19 is operating at an engine speed greater than a predetermined threshold magnitude, the comparison represented by functional block 204 can be skipped. This inclusion of the engine speed comparison is particularly applicable in marine vessel electrical systems that comprise other monitoring devices that automatically reduce the engine speed in the event that a fault is sensed in a component of the electrical system, such as the charging system. Although not necessary in all embodiments of the present invention, functional block 210 can be implemented in an alternative embodiment.

It should also be understood that FIG. 4 is a highly simplified flow chart which is intended to show the basic functions and steps of the present invention, but is not intended to show a particular implementation. The present invention can be implemented through many different alternative ways. In addition, the steps represented in FIG. 4 would typically be combined with many other monitoring steps that are not specifically related to the present invention. Furthermore, additional preselected time delays would normally be implemented in order to allow sufficient time for the operator to respond to various prompts and to allow the system to respond to various actions taken by the present invention. These individual steps are not directly related to the present invention and are not shown in FIG. 4.

In one embodiment of the present invention, the threshold engine speed magnitude is approximately 1800 RPM, wherein the actual idle speed is approximately 575 RPM. In other words, when the engine is operating at speeds less than 1800 RPM, the present invention would monitor the battery potential and alert the operator, the sensing resistor 160 could be a 0.5 OHM resistor, but it should be understood that alternative sensing devices are also within the scope of the present invention. Also, although not specifically identified in FIG. 4, it should be understood that after a selected load is disconnected from the battery 30, the battery voltage is again measured to determine the efficacy of the disconnection step. If the battery voltage is still too low, another load can be disconnected. These steps can continue until the battery voltage eventually rises is above threshold voltage magnitude, which is approximately 13 volts in a preferred embodiment of the present invention. When the operator is notified, as represented in functional block 205, that the battery voltage is less than the threshold, the present invention typically allows the operator approximately one minute with an override command. If that override response is not received within the one minute period, the disconnecting step is performed as represented by functional block 209.

Although the present invention has been described with particular specificity and illustrated to show a preferred embodiment, it should be understood that alternative embodiments are also within its scope.

I claim:

1. A method for controlling the electrical system of a marine vessel, comprising the steps of:

measuring the voltage potential of a battery;

comparing said voltage potential to a threshold voltage magnitude;

disconnecting one or more of a plurality of electrical power consuming devices when said voltage potential is less than said threshold voltage magnitude; and classifying each one of said plurality of said electrical power consuming devices according to its priority of criticality, wherein said priority of criticality is determinative of the order in which each of said plurality of said electrical power consuming devices is disconnected during said disconnecting step, said classifying step comprises the step of grouping said plurality of electrical power consuming devices into a level of said priority of criticality selected from the group consisting of critical and non-critical, said classifying step is performed in accordance with manually received instructions from said operator of said marine vessel.

2. A method for controlling the electrical system of a marine vessel, comprising the steps of:

measuring the voltage potential of a battery;

comparing said voltage potential to a threshold voltage magnitude; and disconnecting one or more of a plurality of electrical power consuming devices when said voltage potential is less than said threshold voltage magnitude;

measuring the operating speed of an engine of said marine vessel;

comparing said operating speed of said engine to a threshold speed magnitude; and performing said disconnecting step only when said operating speed of said engine is less than said threshold speed magnitude.

3. The method of claim 1, further comprising:

communicating to an operator of said marine vessel information that said voltage potential being less than said threshold voltage magnitude; and performing said disconnecting step unless said operator of said marine vessel manually overrides said disconnecting step.

4. The method of claim 3, further comprising:

waiting for at least one minute following said communication step for a response from said operator of said marine vessel before performing said disconnecting step.

5. The method of claim 1, further comprising:

measuring the voltage potential of said battery after said disconnecting step to determine the efficacy of said disconnecting step.

6. The method of claim 1, further comprising:

measuring a current consumption of at least one of said plurality of said electrical power consuming devices;

comparing said current consumption of at least one of said plurality of said electrical power consuming devices to a threshold current magnitude.

7. The method of claim 6, further comprising:

disconnecting said at least one of said plurality of said electrical power consuming devices when said current consumption of at least one of said plurality of said electrical power consuming devices is greater than said threshold current magnitude.

8. The method of claim 1, wherein:

said measuring and comparing steps are repeated at a frequency of at least once per second.

9. A method for controlling the electrical system of a marine vessel, comprising the steps of:

measuring the voltage potential of a battery;

comparing said voltage potential to a threshold voltage magnitude;

communicating to an operator of said marine vessel information that said voltage potential being less than said threshold voltage magnitude; disconnecting one or more of a plurality of electrical power consuming devices when said voltage potential is less than said threshold voltage magnitude unless said operator of said marine vessel manually overrides said disconnecting step;

measuring the operating speed of an engine of said marine vessel;

comparing said operating speed of said engine to a threshold speed magnitude; and performing said disconnecting step only when said operating speed of said engine is less than said threshold speed magnitude.

10. The method of claim 9, further comprising:

waiting for at least one minute following said communication step for a response from said operator of said marine vessel before performing said disconnecting step.

11. The method of claim 9, further comprising:

classifying each one of said plurality of said electrical power consuming devices according to its priority of criticality, wherein said priority of criticality is determinative of the order in which each of said plurality of electrical power consuming devices is disconnected during said disconnecting step, said classifying step comprising the step of grouping said plurality of electrical power consuming devices into a level of said priority of criticality selected from the group consisting of critical and non-critical.

12. The method of claim 11, wherein:

said classifying step is performed in accordance with manually received instructions from said operator of said marine vessel.

13. The method of claim 12, further comprising:

measuring the voltage potential of said battery after said disconnecting step to determine the efficacy of said disconnecting step.

14. A method for controlling the electrical system of a marine vessel, comprising the steps of:

measuring the voltage potential of a battery;

comparing said voltage potential to a threshold voltage magnitude;

measuring the operating speed of an engine of said marine vessel;

comparing said operating speed of said engine to a threshold speed magnitude;

communicating to an operator of said marine vessel information that said voltage potential being less than said threshold voltage magnitude; and disconnecting one or more of a plurality of electrical power consuming devices when said voltage potential is less than said threshold voltage magnitude unless said operating speed of said engine is greater than said threshold speed magnitude or said operator of said marine vessel overrides said disconnecting step.

15. The method of claim 14, further comprising:

waiting for at least one minute following said communication step for a response from said operator of said marine vessel before performing said disconnecting step.

16. The method of claim 15, further comprising:

classifying each one of said plurality of said electrical power consuming devices according to its priority of criticality, wherein said priority of criticality is determinative of the order in which each of said plurality of said electrical power consuming devices is disconnected during said disconnecting step, said classifying step comprising the step of grouping said plurality of electrical power consuming devices into a level of said priority of criticality selected from the group consisting of critical and non-critical, said classifying step being performed in accordance with manually received instructions from said operator of said marine vessel; and measuring the voltage potential of said battery after said disconnecting step to determine the efficacy of said disconnecting step.

* * * * *